United States Patent [19]

Altus et al.

[11] Patent Number: 4,829,627
[45] Date of Patent: May 16, 1989

[54] FLOOR MAT AND METHOD OF ATTACHING RETAINER THERETO

[75] Inventors: Mark Altus, Huntington Wood; David W. Roth, Grosse Pointe Park, both of Mich.

[73] Assignee: The 2500 Corporation, Birmingham, Mich.

[21] Appl. No.: 109,291

[22] Filed: Oct. 15, 1987

[51] Int. Cl.$^4$ .............................................. B32B 3/06
[52] U.S. Cl. ............................................... 16/4; 16/8; 428/85; 428/95; 428/99; 296/97.23
[58] Field of Search .................... 24/697; 428/85, 95, 428/99; 411/508, 509, 510, 908; 16/4, 5, 8, 10, DIG. 40; 404/34, 35, 36; 296/97.23

[56] References Cited

U.S. PATENT DOCUMENTS

| | | | |
|---|---|---|---|
| 4,361,610 | 11/1982 | Roth | 428/95 |
| 4,481,240 | 11/1984 | Roth | 428/95 |
| 4,588,628 | 5/1986 | Roth | 428/85 |
| 4,671,981 | 6/1987 | McLaughlin | 428/95 |
| 4,673,603 | 6/1987 | Roth | 428/85 |
| 4,721,641 | 1/1988 | Bailey | 428/95 |
| 4,748,063 | 5/1988 | Reubon | 428/99 |
| 4,749,602 | 6/1988 | Russell | 428/99 |
| 4,751,764 | 6/1988 | Reubon | 16/4 |
| 4,758,457 | 7/1988 | Altus | 428/99 |

FOREIGN PATENT DOCUMENTS

| | | | |
|---|---|---|---|
| 3243803 | 6/1984 | Fed. Rep. of Germany | 296/97.23 |
| 1124292 | 8/1968 | United Kingdom. | |
| 2087229 | 5/1982 | United Kingdom | 16/4 |
| 2171901 | 9/1982 | United Kingdom | 428/95 |

Primary Examiner—Nicholas P. Godici
Assistant Examiner—Edward A. Brown
Attorney, Agent, or Firm—Gifford, Groh, Sheridan, Sprinkle and Dolgorukov

[57] ABSTRACT

There is disclosed a method of attaching retainers to automotive floor mats, as well as an embodiment of a floor mat utilizing said method. The typical floor mat utilizing this method will have a retainer with a series of male or female fasteners provided on the retainer, and the floor mat will have openings corresponding to these fasteners, through which the other fastener, whether it be male or female, can be passed to firmly attach the floor mat to the retainer. The retainer may be one sided or two sided, their may, or may not be holes in the floor mat, depending on the particular fasteners being used, the openings in the floor mat, if provided, may, or may not, be reinforced, and a heel pad can optionally be attached at the same time.

42 Claims, 2 Drawing Sheets

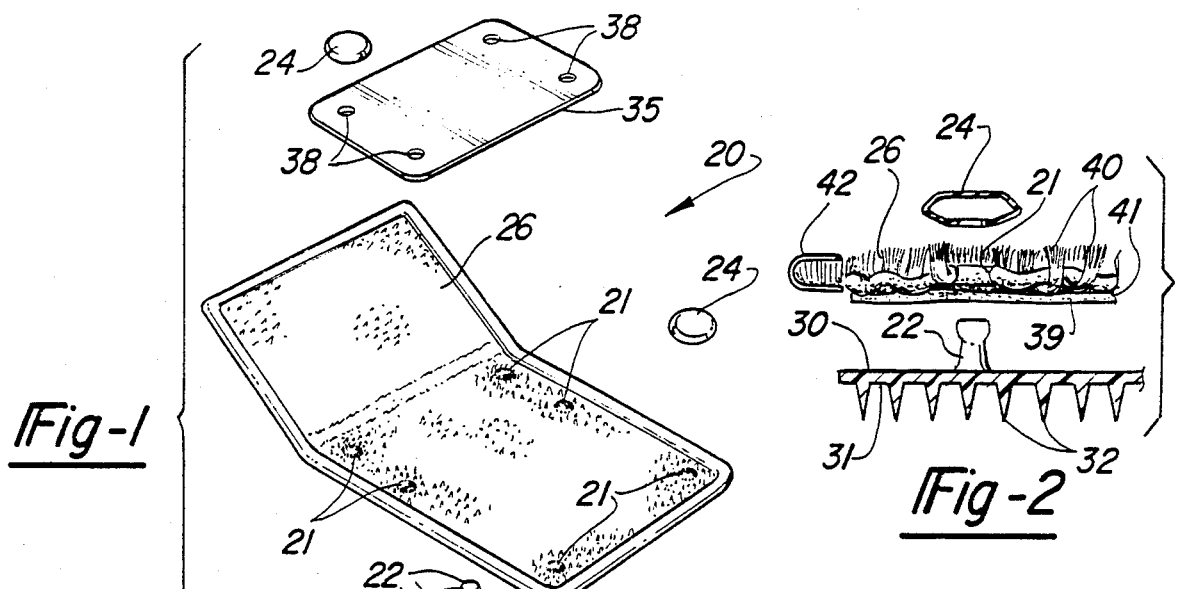
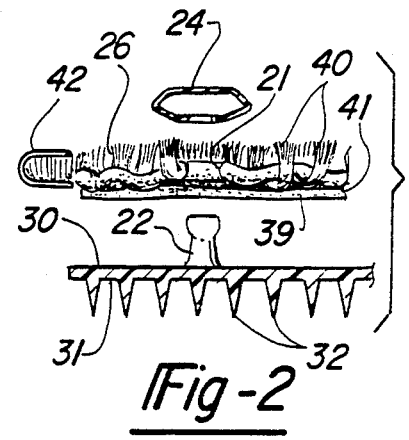
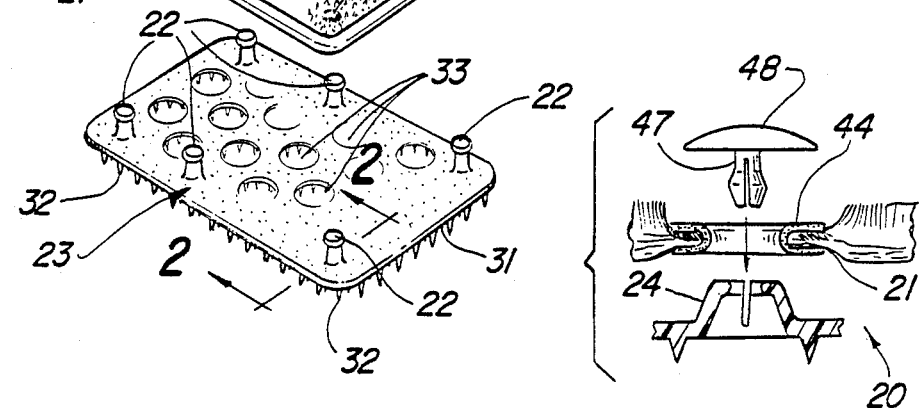
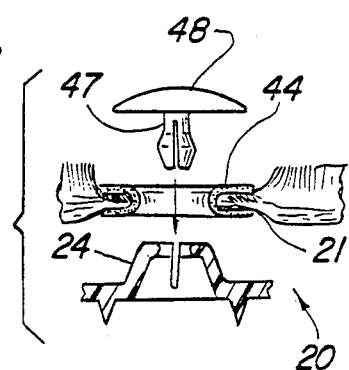
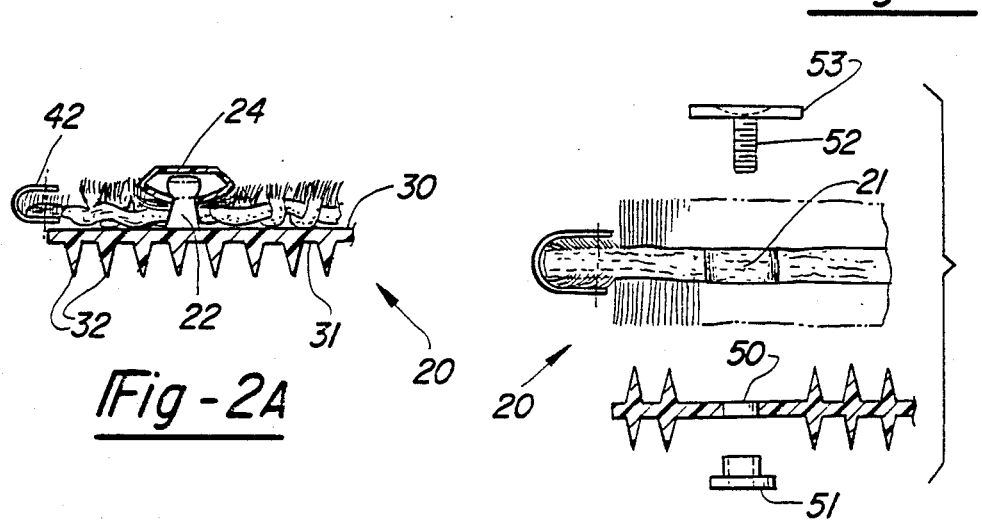
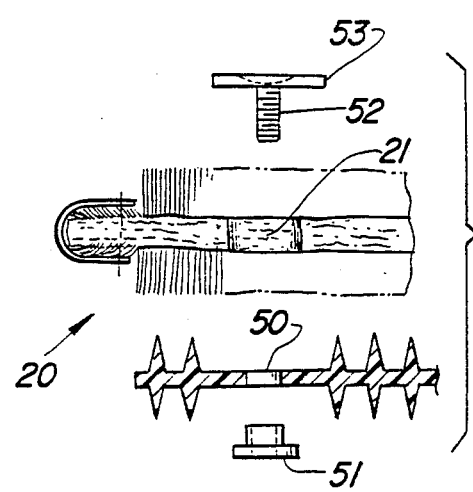

FLOOR MAT AND METHOD OF ATTACHING RETAINER THERETO

FIELD OF THE INVENTION

The present invention relates to automotive floor mats having retainers mounted thereon, and more particularily to a method for attaching said retainers, and embodiments made according to this method. The need for retainers in connection with automotive floor mats is fully discussed in U.S. Letters Pat. Nos. 4,361,610, 4,481,240, 4,588,628, and 4,673,603, owned by the assignee of the present applicaton. It should be understood, however, that the scope of the present application envisions a method of attaching any type of retainer to any type of floor mat by the method disclosed herein.

DESCRIPTION OF THE PRIOR ART

It has long been the practice to cover areas of automotive carpeting which are subjected to heavy wear with separate floor mats which usually have at least one surface covered with a carpet material, although they may be of an all rubber construction. For as long as this has been done, there has been a severe problem with these mats unexpectedly moving, and sometimes causing interference with the proper operation of the brake and/or accelerator pedals in automobiles. Recently there have been recalls involving thousands of automobiles to have their floor mats replaced because they have slipped and jammed under the accelerator pedal and have in some cases caused accidents.

It is believed that this has been a particular problem in the area of automotive floor mats because they are subjected to particular twisting motions from the entrance and exit of occupants of the motor vehicle. A slipping "out from under" of a floor mat when an occupant is attempting to exit the vehicle can lead to serious injury, even when the vehicle is not in motion.

It can be seen, that whether one is concerned about a slipping "out from under" of a floor mat when an occupant is attempting to exit the vehicle, or a "riding up" on the automobile carpeting and under the accelerator, brake, or clutch pedals of the vehicle preventing proper operation thereof, that there are many problems of long standing in the automotive floor mat art which remained unsolved until the applicants entered the field.

Up until the present time, effective retainers for automotive floor mats have either been hingedly mounted to the floor mat, such as in U.S. Letters Pat. No. 4,588,628, assigned to the assignee of the present application, or were sewn in place, such as disclosed in co-pending patent application Ser. No. 002,143, filed Jan. 12, 1987 for "Lightweight Floor Mat with Retainer Means", and also assigned to the common assignee of the applicants, or were formed as an integral part of a floor mat construction, such as shown in co-pending patent application Ser. No. 17,708, filed Feb. 24, 1987, for "Floor Mat With Integral Retainer Means", and assigned to the assignee of the applicants. The above identified patents and applications, together with other floor mat patents assigned to The 2500 Corporation, are the most relevant prior art of which we are aware.

However, the construction disclosed in U.S. Letters Pat. No. 4,588,628 has been found rather expensive to manufacture, and the disclosures shown in the two co-pending applications are somewhat specialized in nature. Therefore, we desired to develop a more universal means of mounting retainers and heel pads to automotive floor mats which can be used in a wide variety of circumstances, which is relatively inexpensive to manufacture, and which at the same time eliminates the heavy latex layer found on present day floor mats. This enables automobile manufacturers to eliminate the weight of the mats from the stated weight of the vehicle under present day regulations, if the mats weigh under three pounds.

SUMMARY OF THE INVENTION

In order to provide a retainer which meets all of the above requirements, we have provided a retainer which may be single-sided or double-sided, and which has mounted thereon either male or female fastening means. The floor mat to which the retainer is to be mounted, which may have carpeting on one or both sides thereof, has corresponding fastening means, so that it may have the retainer attached thereto. For purposes of illustration, an automotive floor mat having at least one side carpeted and having edge binding sewn around the edges thereof will be shown, although our invention can also be used in non-automotive applications.

Once the floor mat is positioned on the retainer, it is snapped in place with the other half of the male or female fastening means. The exact fastener depends on whether a male or female fastening means has been provided on the retainer.

Normally, four snaps will be sufficient to fasten the automotive floor mat to the retainer, since the retainer is only provided for the portion of the mat that is going to be positioned on the floor pan of the automobile, no retainer being provided for the portion of the floor mat resting on the toe pan. However, if six fastening means are provided, a heel pad may be fastened to the top side of the floor mat where it is to be placed under the accelerator and brake pedals of an automobile.

Thus, it is an object of the present invention to provide a method of mounting retainers to an automotive floor mat which is usable in a wide variety of circumstances.

It is a further object of the present invention to provide several embodiments of floor mats manufactured according to the method of the present invention.

It is a further object of the present invention to provide a method of mounting a retainer to an automotive floor mat which provides for use of the floor mat without the heavy latex rubber layer previously needed to keep the floor mat from sliding.

A further object of the present invention is to provide a method of mounting retainers to floor mats which is usable either with a single or two-sided retainer, and/or a single or two-sided floor mat.

A still further object of the present invention is to provide a method of mounting retainers to an automotive floor mat which provides for mounting a heel pad to the top of said automotive floor mat.

It is a further object of the present invention to provide embodiments of automotive floor mats manufactured according to the foregoing method.

It is a still further object of the present invention to provide an automotive floor mat which is relatively simple and inexpensive to manufacture, and light-weight in nature.

A further object of the present invention is to provide an improved light-weight non-skid floor mat having a retainer mounted thereto by appropriate snap-type fastening means.

Further objects and advantages of the present invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 1 is an exploded perspective view showing a construction embodying the present invention.

FIG. 2 is a sectional view, taken in the direction of the arrows, along the section line 2—2 of FIG. 1.

FIG. 2A is a view identical to the exploded sectional view of FIG. 2, showing our construction in its assembled form.

FIG. 4 is a view similar to FIG. 3, but showing a modified fastening means, and a reinforcement of the floor mat.

FIG. 5 is a further modification of our invention, showing the use of a two-sided retainer with a double-sided carpeted floor mat, thus providing for a reversible construction.

Figure 3:
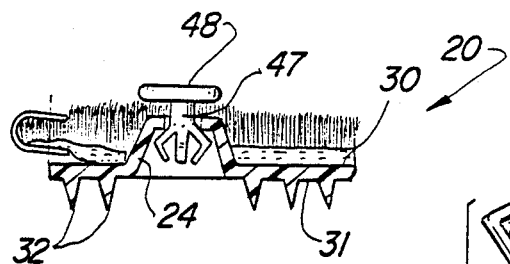
FIG. 3 shows a modification of our invention wherein the female fastener is formed integrally with the retainer.

It is to be understood that the present invention is not limited in its application to the details of the construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENTS

Referring now to FIG. 1, there is shown an exploded perspective view of our construction. The floor mat, generally designated by the numeral 20, has a plurality of openings 21 therein, which may be of various sizes or shapes, and which are placed so as to fit easily over the male fasteners 22, provided on the retainer, which is generally designated by the numeral 23.

Female fasteners 24, are placed over the top of the male fasteners, to fasten the floor mat 20 in place. It should be understood that in the preferred embodiment, the male fasteners 22 are formed integrally with the retainer 23 and have the female fasteners 24 placed thereon to hold the floor mat 20 in place. However, it is well within the scope of the present invention that these parts be reversed, i.e. female fasteners could be formed on the retainer 23, and male fasteners could be placed into the female fasteners through the openings 21 to hold the carpet in place (See FIG. 3). Also, it should be understood that it is not necessary that one or the other of the fasteners be formed integrally with the retainer, but that instead, an opening could simply be placed therein in order to allow for the passing through of the male fastener 22, with the female fastener 24 therein being placed over the separate and distinct male fastener 22 (FIG. 5). Depending on the particular application, one or both of the fasteners could be standard, commercially available fasteners.

The retainer 23, has an upper surface 30, and a lower surface 31. In the embodiment of the construction shown in FIG. 1, the male fastener 22 depends upwardly from the upper surface 30, while the bristles 32 depend downwardly from the lower surface 31. As can be seen by reference to the drawings made a part of this specification, the bristles 32 may be on one or both sides of the retainer, and may cover all or only a portion of the retainer. The length, composition, and exact shape of the bristles will depend on the particular application to which the automotive floor mat to which the retainer is attached is to be put, which in turn, is at least partly dependent on the shape of the automobile floor pan, and on the type and density of the carpet material covering said floor pan. Also, the floor mat 20 may have one or both sides carpeted depending on the application.

In order to save weight, mass reduction openings 33 may be placed in the retainer. These openings may be of various sizes and shapes depending upon the particular application to which the retainer is to be placed.

If desired, a heel pad 35, having mounting holes 38, may be optionally attached to the floor mat 20. In this case, two additional openings 21 would be provided in the floor mat 20, along with two additional male fasteners 22 being provided on the retainer 23. The openings, 21 and 38, would be provided to match the spacing of the male fasteners 22 so that when assembled, the floor mat 20 would fit over the six male fasteners 22, which would protrude through the openings 21, and 38. Female fasteners 24 would then be placed over all of the male fasteners 22 to hold the floor mat and heel pad in place.

As clearly shown in FIG. 2, the carpet 26 may be of a conventional construction, having a scrim layer 39 with a plurality of loops 40 tufted therein, and bound in place by a layer of polyethylene or polypropylene tuftlock 41. It is significant to note the absence of a heavy latex layer found on most conventional floor mats. The latex layer is to protect and waterproof the tuftlock and carpet construction to prolong its life. However, the entire underside of the carpet which meets the floor pan of the motor vehicle, which is where most of the moisture problems are found, will be protected by the retainer, so that the latex layer is not needed. It is believed that the weight of the plastic retainer is approximately ½ of the weight of the latex of the conventional retainer, and thus a significant weight saving is achieved by our construction. To finish the carpet construction, an edge binding 27 is applied to the carpet by means well known in the art.

Referring to FIG. 3, a modification of our construction is shown wherein the female fastener 24 is manufactured integrally with the retainer, and the male fastener 22 is inserted into the female fastener to hold the carpet in place. The rest of the construction is identical to that shown in FIG. 2.

A further modification of our construction is shown in FIG. 4, wherein female fasteners are again provided integrally with retainer 20, and reinforcements 44, are provided in the carpet opening 21 to provide for extra strength. A modified male fastener 47 having a mushroom shaped head 48 is provided, which more evenly distributes the load about the reinforcement 44, and thus about the opening 21, to prolong the life of the floor mat.

The modification of our invention shown in FIG. 5 shows that the male and female fasteners do not need to be integral with the retainer. In this case, a hole 50 is provided in the retainer, which is aligned with the openings 21 in the floor mat 20. A separate female fastener in the form of a nut 51 fits into the hole 50, and a special male fastener 52, having an enlarged head 53, is screwed into the nut 51 to firmly hold the floor mat 20 in place.

Figure 6:
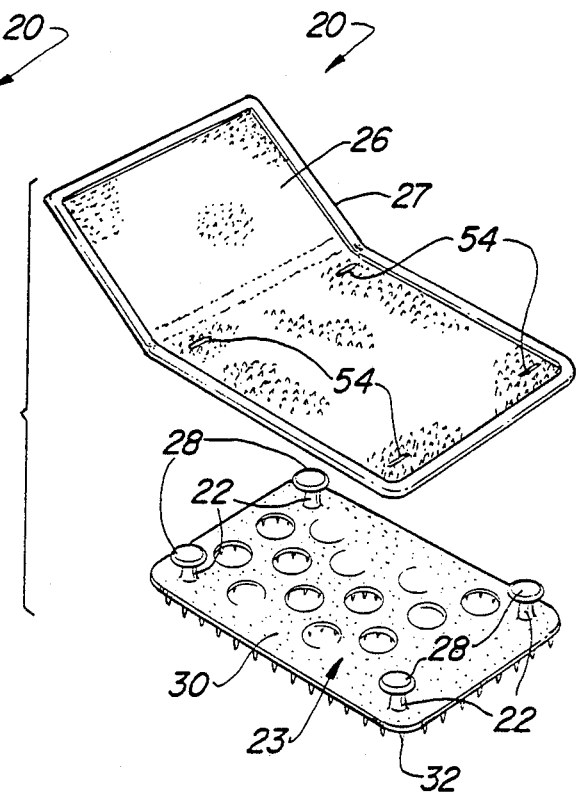
FIG. 6 is an exploded perspective view of our invention showing a "buttonhole" type of attachment of the retainer to the floor mat.

Referring now to FIG. 6, a further modification of our invention is shown wherein the floor mat 20 having carpet 26, and edge binding 27 is provided with a plurality of "buttonhole" type female fasteners 54 to accept a like plurality of male fasteners 22 upstanding from the upper surface 30 of the retainer 23. The enlarged head 28 of the male fasteners 22 "buttons" the retainer 23 to the floor mat 20.

Figure 7:
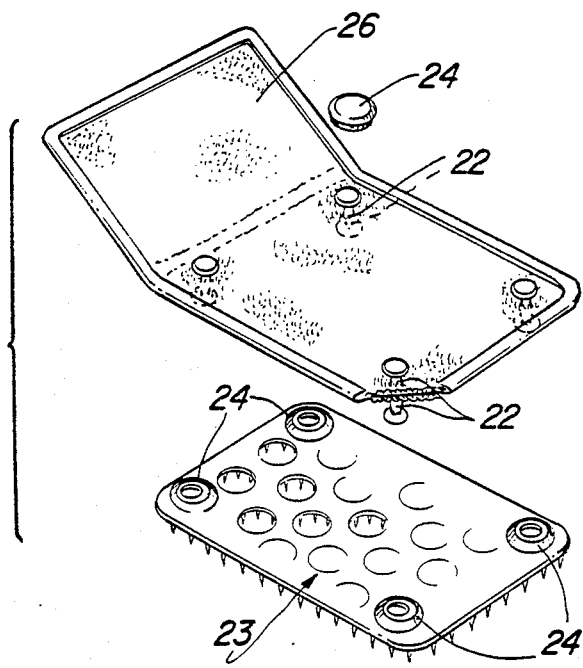
FIG. 7 is an exploded perspective view of a further modification of our invention showing the male fasteners mounted to the floor mat, and the female fasteners formed on the retainer.
Figure 8:
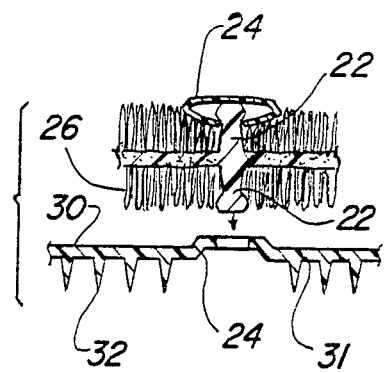
FIG. 8 is an exploded elevational view, partly in section, showing in greater detail the construction of FIG. 7.

As can be seen by FIG. 7, it is not necessary that the male fasteners 22 be placed on the retainer 23. In this modification, the female fasteners 24 are formed integrally with the retainer 23, and the male fasteners are placed on both sides of the floor mat 20. The lower male fasteners 22 are snapped into the female fasteners 24 to hold the floor mat 20 firmly in place. Modified female fasteners 24 are placed over the unused male fasteners 22 on the upper side of the carpet to provide protection or decoration therefore. These may be made in any practicable size or shape, and may have the automakers logo or other insignia placed thereon for decorative purposes. As before, the floor mat 20 may have carpeting 26 on one or both sides thereof, and the retainer 23 may have bristles 32 on one or both sides thereof, depending on the application to which the floor mat is to be put. If desired, the female fasteners 24, may be mounted to the retainer 23 by means well known in the art, instead of being formed integrally with the retainer 23.

Thus, by carefully analyzing the reqirements for manufacturing automotive floor mats, we have developed a novel method of attaching retainers to the same, and several unique embodiments manufactured according to said method.

We claim:

1. A method of attaching retainers to automotive floor mats, said method including the steps of:
   (a) providing a retainer having an upper surface and first fastening means depending upwardly therefrom;
   (b) providing a floor mat construction having openings therein for said first fastening means to pass through;
   (c) providing further fastening means, complimentary to, and for attachment to, said first fastening means;
   (d) placing said floor mat over said first fastening means on said retainer; and,
   (e) attaching said further fastening means to said first fastening means thereby firmly attaching said floor mat to said retainer.

2. The method defined in claim 1, wherein the step of providing a retainer includes the further step of:
   (a) providing a retainer having a lower surface with bristles depending downwardly therefrom.

3. The method defined in claim 2, wherein the step of providing first fastening means includes the step of providing a plurality of male fasteners depending upwardly from said upper planar surface, and wherein the step of providing further fastening means includes the step of providing female fasteners adapted to engage said male fasteners.

4. The method defined in claim 3, and including the step of applying reinforcements about the openings provided in said floor mat construction.

5. The method defined in claim 3, and including the additional step of providing mass reduction openings in said retainer.

6. The method defined in claim 3, and including the additional step of providing a taper to the surface formed by said downwardly depending bristles.

7. A method of attaching retainers to automotive floor mats, said method including the steps of:
   (a) providing a retainer having bristles on at least one side thereof, and a plurality of openings adapted to accept fastening means;
   (b) providing a floor mat construction having openings therein corresponding to said openings in said retainer;
   (c) providing a plurality of fastening means;
   (d) fastening said retainers to said floor mat using said fastening means.

8. The method defined in claim 7, wherein the step of providing a plurality of fastening means including the step of providing a number of female fasteners equal to the number of openings in said retainer.

9. The method defined in claim 8, including the step of providing a corresponding number of male fasteners.

10. The method defined in claim 9, and including the additional step of passing said male, or said female fasteners through said openings in said retainer and said floor mat construction and attaching said male fasteners to said female fasteners, thereby firmly securing said floor mat to said retainer.

11. The method defined in claim 10, and including the additional step of providing reinforcements about said openings in said floor mat construction.

12. The method defined in claim 11, and including the step of placing mass reduction openings in said retainer.

13. The method defined in claim 12, and including the additional step of providing a taper on the surface formed by said bristles.

14. A floor mat construction including:
   (a) a floor mat,
   (b) mounting means, including male and female fasteners, for securing a retainer to said floor mat, and
   (c) a retainer having bristles on at least one side thereof attached to said floor mat by said mounting means.

15. The device defined in claim 14, wherein said male fasteners are formed integrally with said retainer.

16. The device defined in claim 15, wherein:
   (a) openings are provided in said floor mat in alignment with said male fasteners, said male fasteners passing through said openings, and said female fasteners are attached to said male fasteners, thereby fastening said retainer securely in place on said floor mat.

17. The device defined in claim 16, wherein said retainer further includes:
   (a) a lower surface; and
   (b) a lower bristled surface depending downwardly from said lower surface.

18. The device defined in claim 17, wherein the bristles forming said lower bristled surface are formed in such a manner to provide a taper to at least part of said lower bristled surface.

19. The device defined in claim 17, wherein the length of the bristles forming said lower bristled surface is no more than ¾'s of the average length of the carpet-cover material on which the retainer is placed.

20. The device defined in claim 17, wherein the density of the bristles forming said lower bristled surface is from 50 to 100% of the density of the lower carpeted surface where bristles are provided on said retainer.

21. The device defined in claim 20, wherein said retainer further includes:
(a) an upper surface; and
(b) an upper bristled surface depending upwardly from said upper surface.

22. The device defined in claim 21, wherein the bristles forming said upper bristled surface are formed in such a manner to provide a taper to at least part of said upper bristled surface.

23. The device defined in claim 22, wherein said lower bristled surface is symetrical with said upper bristled surface.

24. The device defined in claim 23, wherein said male fasteners are formed integrally with said retainer.

25. The device defined in claim 24, wherein openings are provided in said floor mat to provide clearance about said male fasteners and said male fasteners are attached to said female fasteners to hold said retainer firmly in place on said floor mat.

26. The device defined in claim 21, wherein openings are provided in said retainer, as well as said floor mat, and said fastening means are separate and distinct from said floor mat and said retainer.

27. The device defined in claim 25, wherein openings are provided in said retainer, as well as in said floor mat, and said fasteners means are separate and distinct from said floor mat and said retainer.

28. The device defined in claim 15, wherein:
(a) said female fasteners, in the form of "buttonholes" are provided in said floor mat in alignment with said male fasteners, said male fasteners passing through said "buttonholes" thereby fastening said retainer securely in place on said floor mat.

29. The device defined in claim 28, wherein said retainer further includes:
(a) a lower surface; and
(b) a lower bristled surface depending downwardly from said lower surface.

30. The device defined in claim 29, wherein the bristles forming said lower bristled surface are formed in such a manner so as to provide a taper to at least part of said lower bristled surface.

31. The device defined in claim 29, wherein the length of the bristles forming said lower bristled surface is no more than ¾'s of the average length of the carpet-cover material on which the retainer is placed.

32. The device defined in claim 29, wherein the density of the bristles forming said lower bristled surface is from 50% to 100% of the density of the carpet-cover material where bristles are provided on said retainer.

33. The device defined in claim 14, wherein:
(a) said female fasteners are provided on said retainer; and
(b) said male fasteners are provided on one or both sides of said floor mat.

34. The device defined in claim 33, wherein said downwardly extending male fasteners on said floor mat engage said female fasteners provided on said retainer, thereby fastening said retainer securely in place on said floor mat.

35. The device defined in claim 34, wherein additional female fasteners are placed over the unused upper male fasteners, if provided, for decorative purposes.

36. The device defined in claim 35, wherein said retainer further includes:
(a) a lower surface; and
(b) a lower bristled surface depending downwardly from said lower surface.

37. The device defined in claim 36, wherein the bristles forming said lower bristled surface are formed in such a manner as to provide a taper to at least part of said lower bristled surface.

38. The device defined in claim 36, wherein the length of the bristles forming said lower bristled surface is no more than ¾'s of the average length of the carpet-cover material on which said retainer is to be placed.

39. The device defined in claim 36, wherein the density of the bristles forming said lower bristled surface is from 50% to 100% of the density of the carpet-cover material where bristles are provided on said retainer.

40. The method defined in claim 2, and including the additional steps of:
(a) providing a heel pad having mounting holes for at least some of said fastening means to pass through,
(b) placing said heel pad over said first fastening means after said floor mat is placed over said retainer; and
(c) attaching said further fastening means to said first fastening means, thereby firmly attaching said floor mat and said heel pad to said retainer.

41. The method defined in claim 9, and including the additonal steps of:
(a) providing a heel pad having mounting holes therein corresponding to at least some of said openings in said retainer; and
(b) passing said male fasteners, or said female fasteners, through said openings in said retainer, said mounting holes in said heel pad, and said openings in said floor mat construction, and attaching said male fasteners to said female fasteners, thereby firmly securing said floor mat and said heel pad to said retainer.

42. A floor mat construction including:
(a) a floor mat,
(b) fastening means, including male and female fasteners, for securing a heel pad and a retainer to said floor mat,
(c) a heel pad attached to the top side of said floor mat by at least some of said fastening means; and
(d) a retainer attached to the under side of said floor mat by at least some of said fastening means.

* * * * *